US007653792B2

(12) United States Patent
Shimada et al.

(10) Patent No.: US 7,653,792 B2
(45) Date of Patent: Jan. 26, 2010

(54) DISK ARRAY APPARATUS INCLUDING CONTROLLER THAT EXECUTES CONTROL TO MOVE DATA BETWEEN STORAGE AREAS BASED ON A DATA PROTECTION LEVEL

(75) Inventors: Akinobu Shimada, Chigasaki (JP); Yasuaki Nakamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 11/328,288

(22) Filed: Jan. 10, 2006

(65) Prior Publication Data
US 2006/0190694 A1 Aug. 24, 2006

Related U.S. Application Data

(63) Continuation of application No. 10/771,455, filed on Feb. 5, 2004, now Pat. No. 7,152,149.

(30) Foreign Application Priority Data
Nov. 27, 2003 (JP) ............................. 2003-397764

(51) Int. Cl.
*G06F 12/02* (2006.01)
*G06F 12/14* (2006.01)
(52) U.S. Cl. ...................................... 711/152; 711/163
(58) Field of Classification Search ................ 711/152, 711/163
See application file for complete search history.

(56) References Cited

U.S. PATENT DOCUMENTS

| 5,392,244 | A |   | 2/1995  | Jacobson et al.              |
|-----------|---|---|---------|------------------------------|
| 5,537,588 | A |   | 7/1996  | Engelmann et al.             |
| 5,584,018 | A |   | 12/1996 | Kamiyama                     |
| 5,832,222 | A | * | 11/1998 | Dziadosz et al. ....... 709/216 |
| 5,893,139 | A |   | 4/1999  | Kamiyama                     |
| 5,937,414 | A | * | 8/1999  | Souder et al. ............ 707/203 |
| 6,052,759 | A | * | 4/2000  | Stallmo et al. ............ 711/114 |
| 6,269,382 | B1 |  | 7/2001  | Cabrera et al.               |
| 6,446,161 | B1 |  | 9/2002  | Yamamoto et al.              |

(Continued)

FOREIGN PATENT DOCUMENTS

EP          1158395          11/2001

(Continued)

OTHER PUBLICATIONS

Search Report dated Aug. 25, 2009.

*Primary Examiner*—Shane M Thomas
(74) *Attorney, Agent, or Firm*—Brundidge & Stanger, P.C.

(57) ABSTRACT

A disk array apparatus capable of effecting saving and operation of data through a simple construction. When a host computer sets "write inhibit" or "read/write inhibit" for an LDEV which is set on a first storage device, this setting is registered in an access attribute management table and is also reflected onto a migration management table. A migration control program moves the LDEV for which access limitation has been set to a lower-speed (lower-performance) second storage device or to an external storage device. When the access limitation is released, the moved LDEV is restored to the first storage device from the storage device to which the LDEV has been moved. By performing migration control in interlocking relation to control of access attributes, it is possible to obtain a simple data saving function and data management function.

15 Claims, 12 Drawing Sheets

U.S. PATENT DOCUMENTS

| | | |
|---|---|---|
| 6,457,098 B1 * | 9/2002 | DeKoning et al. .......... 711/114 |
| 6,658,541 B2 | 12/2003 | Kitamura et al. |
| 6,691,136 B2 | 2/2004 | Lee et al. |
| 6,732,230 B1 | 5/2004 | Johnson et al. |
| 6,792,503 B2 | 9/2004 | Yagi et al. |
| 6,826,665 B1 | 11/2004 | Nambu |
| 7,188,194 B1 * | 3/2007 | Kuik et al. ................... 709/249 |
| 2002/0095549 A1 | 7/2002 | Matsunami et al. |
| 2002/0166026 A1 | 11/2002 | Ulrich et al. |
| 2002/0184443 A1 | 12/2002 | Katsuragi et al. |
| 2003/0004981 A1 | 1/2003 | Kaneda et al. |
| 2003/0172106 A1 * | 9/2003 | Highleyman et al. ........ 709/106 |
| 2004/0073677 A1 | 4/2004 | Honma et al. |
| 2004/0260894 A1 * | 12/2004 | Keohane et al. ............. 711/162 |
| 2005/0108302 A1 * | 5/2005 | Rand et al. .................. 707/204 |
| 2005/0165617 A1 * | 7/2005 | Patterson et al. ............... 705/1 |

FOREIGN PATENT DOCUMENTS

| | | |
|---|---|---|
| EP | 1158409 | 11/2001 |
| EP | 1237087 | 9/2002 |
| EP | 1274010 | 1/2003 |
| EP | 1276034 | 1/2003 |
| JP | 1011228 | 1/1998 |
| JP | 1027070 | 1/1998 |
| JP | 2000-112822 | 4/2000 |
| JP | 2001-75873 | 3/2001 |
| JP | 2003015931 | 1/2003 |
| JP | 2003044421 | 2/2003 |

* cited by examiner

| GROUP # | LDEV # | USE STATUS | DISK ATTRIBUTE |
|---|---|---|---|
| #1 | #01 | USED | HIGH SPEED INTERNAL DEVICE |
| | #02 | USED | |
| | #03 | USED | |
| | #04 | RESERVABLE | |
| #2 | #05 | USED | LOW SPEED INTERNAL DEVICE |
| | #06 | RESERVABLE | |
| | #07 | USED | |
| #3 | #08 | RESERVABLE | LOW SPEED EXTERNAL DEVICE |

| LDEV # | INHIBIT ATTRIBUTE | DATE AND TIME OF SETTING |
|---|---|---|
| #02 | WRITE INHIBIT | 2003/09/01 00:00 |
| #03 | READ/WRITE INHIBIT | 2003/09/11 03:30 |

| LDEV # | READ INHIBIT BIT | WRITE INHIBIT BIT | INQUIRY INHIBIT BIT | READ CAPACITY 0 REPORT BIT | S-VOL DISABLE BIT |
|---|---|---|---|---|---|
| #01 | 0 | 0 | 0 | 0 | 0 |
| #02 | 0 | 1 | 0 | 0 | 0 |
| #03 | 1 | 1 | 0 | 0 | 0 |
| #04 | 0 | 0 | 0 | 0 | 0 |
| ... | ... | ... | ... | ... | ... |

FIG. 3A

| ATTRIBUT MODE \ OPERATION | READ | WRITE | INQUIRY | READ CAPACITY 0 | S-VOL DISABLE |
|---|---|---|---|---|---|
| READ/WRITE ENABLE | ○ | ○ | ○ | REAL CAPACITY | ○ |
| READ ONLY | ○ | × | ○ | REAL CAPACITY | ○ |
| READ/WRITE DISABLE | × | × | ○ | REAL CAPACITY | ○ |
| READ CAPACITY 0 | × | × | ○ | "0" | ○ |
| INQUIRY INHIBIT | × | × | × | × | ○ |
| S-VOL DISABLE | ○ | ○ | ○ | REAL CAPACITY | × |

FIG. 3B

| ATTRIBUTE MODE | ACCESS ATTRIBUTE CONTROL INFORMATION | | | | |
|---|---|---|---|---|---|
| | READ INHIBIT BIT | WRITE INHIBIT BIT | INQUIRY INHIBIT BIT | READ CAPACITY 0 REPORT BIT | S-VOL DISABLE BIT |
| READ/WRITE ENABLE | 0 | 0 | 0 | 0 | 0 |
| READ ONLY | 0 | 1 | 0 | 0 | 0 |
| READ/WRITE DISABLE | 1 | 1 | 0 | 0 | 0 |
| READ CAPACITY 0 | 1 | 1 | 0 | 1 | 0 |
| INQUIRY INHIBIT | 1 | 1 | 1 | 0 | 0 |
| S-VOL DISABLE | 0 | 0 | 0 | 0 | 1 |
| RELEASE | 0 | 0 | 0 | 0 | 0 |

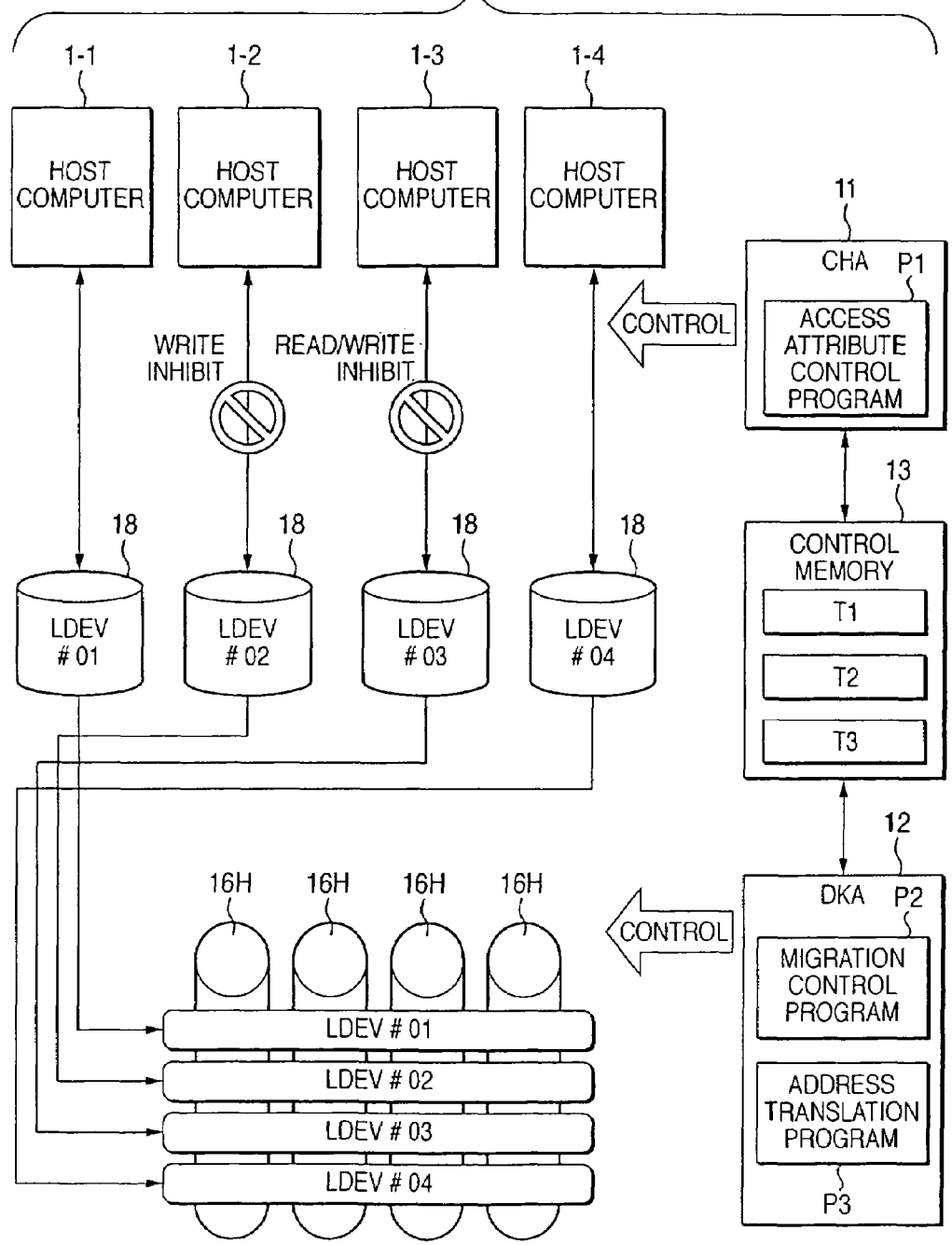

| GROUP # | LDEV # | USE STATUS | DISK ATTRIBUTE |
|---------|--------|------------|----------------|
| #1 | #01 | USED | HIGH SPEED INTERNAL DEVICE |
| | #02 | RESERVABLE | |
| | #03 | USED | |
| | #04 | RESERVABLE | |
| #2 | #05 | USED | LOW SPEED INTERNAL DEVICE |
| | #06 | RESERVABLE | |
| | #07 | USED | |
| #3 | #08 | USED (#02) | LOW SPEED EXTERNAL DEVICE |

| LDEV # | INHIBIT ATTRIBUTE | DATE AND TIME OF SETTING |
|--------|-------------------|--------------------------|
| #02 | — | 2003/12/01 00:00 |
| #03 | READ/WRITE INHIBIT | 2003/09/11 03:30 |

| LDEV # | READ INHIBIT BIT | WRITE INHIBIT BIT | INQUIRY INHIBIT BIT | READ CAPACITY 0 REPORT BIT | S-VOL DISABLE BIT |
|--------|------------------|-------------------|---------------------|----------------------------|-------------------|
| #01 | 0 | 0 | 0 | 0 | 0 |
| #02 | 0 | 0 | 0 | 0 | 0 |
| #03 | 1 | 1 | 0 | 0 | 0 |
| #04 | 0 | 0 | 0 | 0 | 0 |
| ... | ... | ... | ... | ... | ... |

DISK ARRAY APPARATUS INCLUDING CONTROLLER THAT EXECUTES CONTROL TO MOVE DATA BETWEEN STORAGE AREAS BASED ON A DATA PROTECTION LEVEL

CROSS-REFERENCES TO RELATED APPLICATIONS

This is a continuation application of U.S. Ser. No. 10/771,455, filed Feb. 5, 2004, now U.S. Pat. No. 7,152,149.

BACKGROUND OF THE INVENTION

The present invention relates to a disk array apparatus in which it is possible to utilize a plurality of kinds of storage devices, and to a control method for control of the disk array apparatus.

A disk array apparatus is constructed on the basis of, for example, the use of RAID (Redundant Array of Independent Inexpensive Disks), in which a multiplicity of disk drives are disposed in an array. Each of the disk drives has a physical storage area; and, logical volumes (logical devices), which constitute logical storage areas, are formed on the physical storage area. A host computer is capable of reading and writing desired data from and to the disk array apparatus by issuing a write command or a read command having a predetermined format to the disk array apparatus.

One known example of a technique for exerting access control on data stored in the disk array apparatus is embodied in a disk control method described in a patent publication (JP-A-2000-112822). This method sets any one of three kinds of access attributes, including "read and write enable", "write disable" and "read and write disable", for each logical device in a RAID system. In addition, this method changes the response and processing as to various commands sent from a host computer in accordance with access attributes set for individual logical devices.

Independently of demands for access control on logical devices, there are increasing market demands for long-term saving of data stored in logical devices. For example, organizations, such as enterprises and government and municipal offices, manage various kinds and large quantities of data, such as electronic mail data, contract data and document data. Some of these kinds of data need to be saved for a predetermined period by law or company policy. Although the period of obligatory saving differs for the kinds of data, certain kinds of data must be saved for a period of several to ten and several years (or far more years).

For this reason, a system manager archives and manages data that must be saved for a long term. At the request of an audit organization or the like, the system manager searches for and accesses the corresponding long-term saved data from a disk array apparatus and provides the requested data to the audit organization or the like. Accordingly, if various kinds and large quantities of data are to be saved for a long term, the system manager needs to manage the storage areas of individual data and the like, and must perform time-consuming work for management, operation and maintenance of long-term saved data.

SUMMARY OF THE INVENTION

An object of the present invention is to provide a disk array apparatus in which it is possible to manage and operate data in a simple manner, and to provide a control method for control of such a disk array apparatus.

Another object of the present invention is to provide a disk array apparatus in which it is possible to easily save and manage data for a long term even if the environment of the host system changes, and a control method for control of such a disk array apparatus.

Other objects of the invention will become apparent from the following description of an exemplary embodiment of the invention.

BRIEF DESCRIPTION OF THE DRAWINGS

FIG. 2A is a diagram showing the data of an LDEV configuration management table;

FIG. 2B is a diagram showing the data of a migration management table;

FIG. 2C is a diagram showing the data of an access attribute management table;

FIG. 3A is a diagram showing the correspondence between access attribute modes and enabled operations;

FIG. 3B is a diagram showing the correspondence between access attribute modes and inhibit bits;

FIG. 4 is a block diagram showing the relationship between storage devices and LDEVs;

FIGS. 12A to 12C are diagrams showing the states of the respective tables relative to data restoration.

DESCRIPTION OF THE SPECIFIC EMBODIMENTS

Figure 1:
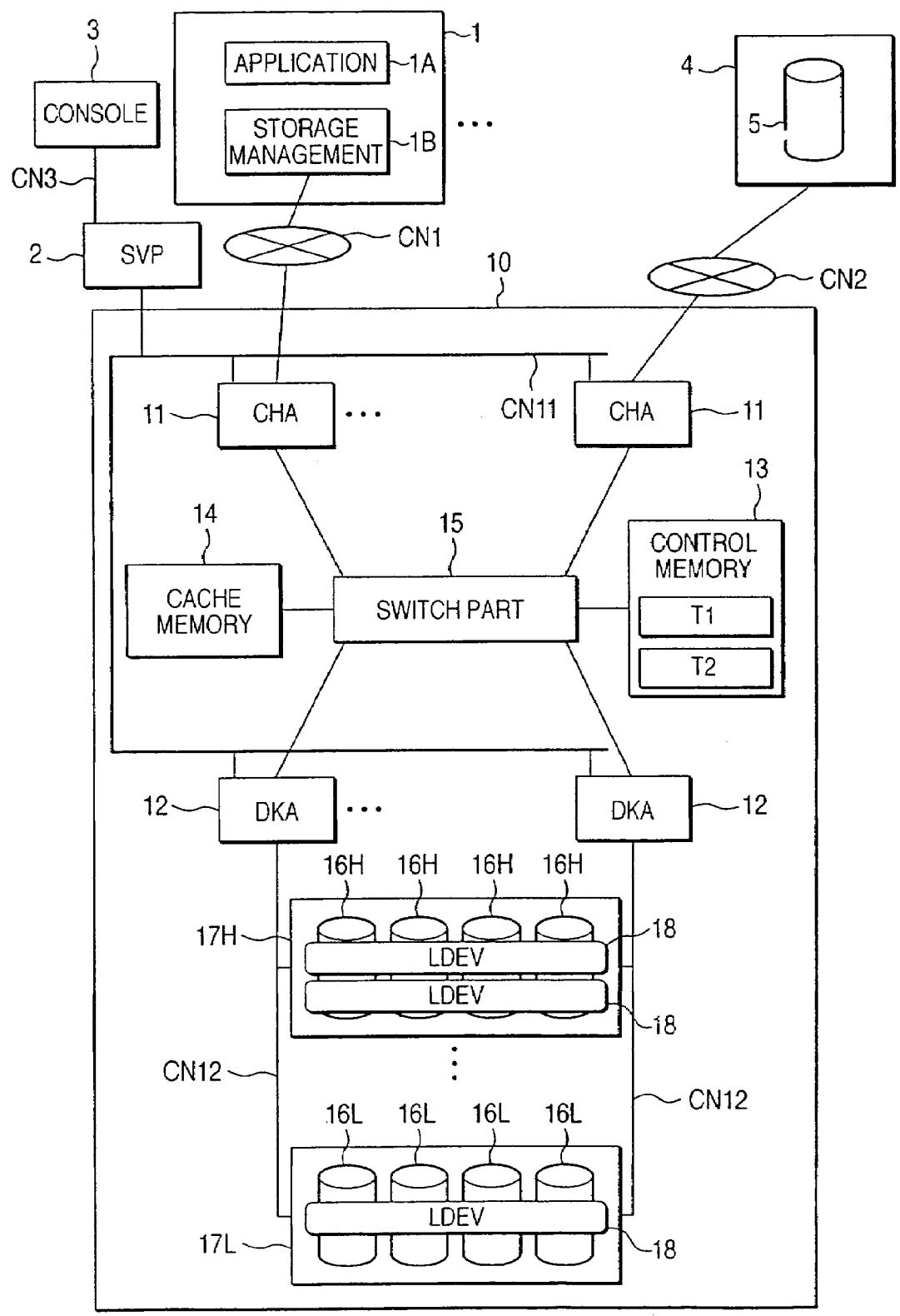
FIG. 1 is a block diagram schematically showing the whole of a disk array apparatus according to an embodiment of the invention.

To solve the above-described problems, a disk array apparatus according to the present invention includes a host adapter for transferring data between a host system and the disk array apparatus, a cache memory for storing data written from the host adapter, a storage device adapter for executing control to write data to the cache memory or to read data from the cache memory, a control memory to which control information is to be written by the host adapter and the storage device adapter, a plurality of kinds of storage devices to which data is to be written on the basis of control of the storage device adapter, and a data movement control part provided in the storage device adapter. The host adapter creates a plurality of logical devices on the basis of storage areas of the plurality of kinds of storage devices and executes control to cause the plurality of logical devices to be objects to be accessed from the host system. The data movement control part executes control, when the host adapter receives an access control command to specify an access operation to a first logical device included in the plurality of logical devices, to move data associated with the first logical device among a plurality of storage devices that are different in reliability from one another and are included in the plurality of kinds of storage devices, according to the content of the specified access operation.

The host system is constructed as, for example, a personal computer, a workstation, a server, a main frame, or a portable information terminal. The storage devices are constructed as storage devices, such as hard disk drives, flexible disk drives or semiconductor memory devices. The plurality of kinds of storage devices, each having a different attribute, are, for example, high performance internal devices and low performance internal devices, high speed internal devices and low speed internal devices, storage devices having a high reliability and storage devices having a low reliability, or storage devices provided inside the disk array apparatus and storage devices existing in a storage control device outside the disk array apparatus.

The data movement control part can be provided in, for example, the storage device adapter. Otherwise, the data movement control part can also be realized by cooperation between the storage device adapter and the host adapter. The data movement control part can be realized by a computer program, the cooperative work between a computer program and a hardware circuit, or a hardware circuit. The data movement control part, when receiving an access control command from the host system, moves data among the plurality of storage devices (for example, among storage devices having different reliabilities). The access control command includes commands having a data manipulation preventing function, such as a write inhibit command (read only) and a read/write inhibit command (read and write disable). Any of these commands inhibits writing and has a certain effect in preventing data manipulation. Any of the access control commands can be configured to control access operations in units of storage devices created on the basis of storage areas of the storage devices. The data movement control part can move data in units of logical devices.

The data movement control part can move data stored in the first storage device to the second storage device when the access operation relative to the data is limited by the access control command.

On the other hand, the data movement control part can move the data stored in the second storage device to the first storage device when the limitation of the access operation relative to the data is released by the access control command.

In this manner, when, for example, a write inhibit command or a read/write inhibit command is issued from the host system, the data movement control part moves the data stored in the first storage device to the second storage device according to this command.

On the other hand, for example, when a mode, such as "write inhibit" or "read/write inhibit", is released, the data movement control part restores the data that was moved to the second storage device back to the first storage device. Accordingly, merely by specifying the access attribute of data, it is possible to change the storage position of the data.

Otherwise, when the access operation relative to the data stored in the first storage device is limited by the access control command, the data movement control part can move the data to the second storage device after a preset predetermined time has elapsed. Namely, even when the access operation is limited, it is possible to maintain the current accessibility for a predetermined time merely by maintaining the current storage position for the predetermined time.

The access control command includes a first access control command which applies a relatively larger limitation to the access operation and a second access control command which applies a relatively smaller limitation to the access operation. The data movement control part (1) moves the data stored in the first storage device to the second storage device when the access operation relative to the data is limited by the first access control command, and (2) moves the data stored in the first storage device to the second storage device after a preset predetermined time has elapsed, when the access operation relative to the data is limited by the second access control command.

Namely, it is possible to change data moving methods according to the kind of access control command. For example, the first access control command can be a write/read inhibit command, while the second access control command can be a read inhibit command.

In the case where the second storage device includes an upper-side second storage device and a lower-side second storage device, the data movement control part (1) moves the data stored in the first storage device to the lower-side second storage device when the access operation relative to the data is limited by the first access control command, and (2) when the access operation relative to the data stored in the first storage device is limited by the second access control command, the data movement control part moves the data to the upper-side second storage device, and after a preset predetermined time has elapsed, it can move the data back to the lower-side second storage device.

For example, the first storage device can be constructed as a storage device of high performance, high reliability or high speed; an upper-side second storage device can be constructed as a storage device of medium performance, medium reliability or medium speed; and the lower-side storage device can be constructed as a storage device of low performance, low reliability or low speed. The data movement control part changes data moving methods according to the kind of access control. command. In response to a predetermined access control command, the data movement control part performs data movement a plurality of times to vary the storage position of data in a step-by-step manner.

In one embodiment of the invention, a management table, which temporarily manages a limitation content of the access operation when the host adapter receives the access control command, is constructed in the control memory. The data movement control part controls movement of the data by referring to the management table.

The invention can also be understood as providing a control method for an disk array apparatus. The whole or part of the invention can be configured as a computer program. This computer program can be circulated in the form of software stored in a storage medium, such as a hard disk drive, an optical disk drive or a semiconductor memory device, and it can also be circulated via a communications network, such as the Internet.

An embodiment of the invention will be described below with reference to FIGS. 1 to 12C. As will be described hereinafter, the invention realizes a simple data saving function by causing cooperation between access attribute control on logical devices and movement control on the logical devices.

FIG. 1 is a block diagram showing an example of the construction of a disk array apparatus 10.

The disk array apparatus 10 is connected to a plurality of host computers 1 (only one of which is shown) via a communications network CN1 to permit bi-directional communication therebetween. The communications network CN1 includes, for example, a LAN (Local Area Network), a SAN (Storage Area Network) and the Internet. In the case where a LAN is used, the data transfer between the host computer 1 and the disk array apparatus 10 is performed in accordance with TCP/IP (Transmission Control Protocol/Internet Protocol). In the case where a SAN is used, the data transfer between each of the host computer 1 and the disk array apparatus 10 is performed in accordance with the Fibre Channel Protocol. In addition, if the host computer 1 is a main frame, data communication is performed in accordance with a communication protocol such as FICON (Fiber Connection: registered trademark), ESCON (Enterprise System Connection: registered trademark), ACONARC (Advanced Connection Architecture: registered trademark), and FIBARC (Fibre Connection Architecture: registered trademark).

The host computer 1 is realized as, for example, a server, a personal computer, a workstation, a main frame or a portable information terminal. For example, the host computer 1 is connected to a plurality of client terminals that are disposed at outside locations (not shown in FIG. 1), via another communications network. The host computer 1 provides services to each of the client terminals by performing read/write of data from/to the disk array apparatus 10 according to, for example, a request from each of the client terminals. The host computer 1 is provided with, for example, an application program 1A, such as electronic mail management software, and storage management software 1B. As will be described later, the storage management software 1B is used for setting access attributes and the like for individual logical devices.

A SVP (Service Processor) 2 is a computer unit that shows for providing management and monitoring of the disk array apparatus 10. The SVP 2 collects various kinds of information, such as environment information and performance information, from each channel adapter (hereinafter abbreviated CHA) 11 and each disk adapter (hereinafter abbreviated DKA) 12 via a communications network CN11 provided in the disk array apparatus 10. The information acquired by the SVP 2 includes, for example, an apparatus configuration, a power source alarm, a temperature alarm and an input/output speed (IOPS). The communications network CN11 is configured as, for example, a LAN. A system manager can perform various management operations, such as the process of setting the RAID configuration of the disk array apparatus 10 and the lockout processing of various packages (such as the CHAs 11, the DKAs 12, disk drives), via a user interface provided by the SVP 2. A console 3 is connected to the SVP 2 via a communications network CN3 and acquires the information collected by the SVP 2, and it makes it possible to generate instructions, such as an instruction to modify the RAID configuration. A communications network CN2 may use, for example, a LAN or the Internet.

The disk array apparatus 10 is connected to an external storage control device 4 via the communications network CN2. The external storage control device 4 can be configured as a disk array apparatus having a storage device 5. The storage device 5 of the external storage control device 4 is mapped into the disk array apparatus 10, and it is used as if it were an internal device of the disk array apparatus 10. A plurality of mapping methods may be adopted. One method is to allocate the external storage device 5 directly to a LUN (Logical Unit Number) of the disk array apparatus 10. Another method is to provide an intermediate virtual logical device (LDEV) below a LUN of the disk array apparatus 10 and to allocate the storage device 5 to this intermediate virtual device.

The disk array apparatus 10 includes the channel adapters (CHAs) 11, the disk adapters (DKAs) 12, a control memory 13, a cache memory 14, a switch part 15, and storage devices 16, as will be described later. The CHAs 11 and the DKAs 12 are realized by providing cooperation between, for example, a control program and a printed circuit board on which a processor, a memory and the like are mounted.

The disk array apparatus 10 is provided with a plurality of (for example, four or eight) CHAs 11. The CHAs 11 are one example of host adapters, and they are prepared according to the kinds of host computers 1, like CHAs for an open system or CHAs for a main frame system. Each of the CHAs 11 controls the data transfer between a corresponding one of the host computers 1 and the disk array apparatus 10. Each of the CHAs 11 is provided with a processor part, a data communication part and a local memory part (none of which is shown).

Each of the CHAs 11 receives a command indicative of a data read/write request and data from the corresponding one of the host computers 1 which are connected to the respective CHAs 11, and it operates in accordance with the command received from the corresponding host computer 1. First, the operations of the CHAs 11 will be described below with reference to the operations of the DKAs 12. For example, when the CHA 11 (shown on the left-hand side of FIG. 1) receives a data read command from the host computer 1, the CHA 11 stores the read command into the control memory 13. The DKA 12 is constantly referring to the control memory 13, and when the DKA 12 discovers the unprocessed read command, the DKA 12 reads data from the storage devices 16 and stores the read data into the cache memory 14. The CHA 11 reads the data transferred to the cache memory 14 and transmits the read data to the host computer 1 which has issued the data read command. In addition, for example, when the CHA 11 receives a command indicative of a data write request from the host computer 1, the CHA 11 stores the write command into the control memory 13 and also stores received data into the cache memory 14. The DKA 12 stores the data stored in the cache memory 14 into a predetermined one of the storage devices 16, in accordance with the command stored in the control memory 13. Furthermore, as will be described later, when an access attribute command is issued from the host computer 1, the CHA 11 sets the access attribute of the requested logical device (LDEV) and executes access control.

A plurality of (for example, four or eight) DKAs 12 are provided in the disk array apparatus 10, Each of the DKAs 12 controls the data transfer between the storage devices 16 and the cache memory 14 and is provided with a processor part, a data communication part and a local memory part (none of which is shown). The DKAs 12 and the storage devices 16 are connected to one another via a communications network CN12, such as a SAN, and they perform data transfer in units of blocks in accordance with the Fibre Channel Protocol. Each of the DKAs 12 is constantly monitoring the states of the storage devices 16, and they transmit the result of this monitoring to the SVP 2 via the internal network CN11.

The disk array apparatus 10 is provided with a multiplicity of storage devices 16. The storage devices 16 may be realized as, for example, hard disk drives (HDDs) or semiconductor memory devices. In this disk array apparatus 10, one RAID group 17 can be formed by, for example, four of the storage devices 16. RAID groups 17 are disk groups each of which realizes redundant storage of data in accordance with, for example, RAID 5 (RAID 5 is not limitative). At least one logical device (LDEV) 18, which constitutes a logical storage area, can be set on a physical storage area provided by each of the RAID groups 17. It is to be noted that one RAID group is formed by storage devices of the same kind.

The disk array apparatus 10 is provided with a plurality of different kinds of storage devices 16H and 16L, each having a different attribute. The first storage devices 16H are one example of "first storage devices", and they are storage devices having high performance, high speed or high reliability. The second storage devices 16L are one example of "second storage devices" or "upper-side second storage devices". The second storage devices 16L have low performance, low speed or low reliability compared to the first storage devices 16H. The storage device 5, which is used like an internal storage device of the disk array apparatus 10 by mapping techniques, is one example of "lower-side second storage devices". In terms of access speed and response speed, the first storage devices 16H, the second storage devices 16L and the second storage devices 5 are faster in that order. In the following description, if the first storage devices 16H and the second storage devices 16L need not particularly be distinguished, the first and second storage devices 16H and 16L will be generally referred to as the "storage devices 16".

The control memory 13 is made of, for example, a nonvolatile memory, and it stores control information, management information and the like. The cache memory 14 mainly stores data. The control memory 13 also stores management tables T1 to T3, which will be described below.

Examples of the structures of the respective management tables T1 to T3 stored in the control memory 13 will be described below with reference to FIGS. 2A to 2C. FIG. 2A is a diagram showing a schematic structure of the LDEV configuration management table T1 stored in the disk array apparatus 10. The LDEV configuration management table T1 manages, for example, RAID group numbers, LDEV numbers, status information, and attribute information, associating these items with one another. The RAID group numbers are assigned to the respective RAID groups 17 which constitute a RAID system, and LDEV numbers are used for identifying the individual LDEVs 18 belonging to each of the RAID groups 17. Status information indicates the use status of each of the LDEVs 18, and attribute information indicates the attributes of the storage devices 16 which constitute each of the RAID groups 17.

The status information may include, for example, three kinds of information which are respectively named "used", "reservable" and "used (LDEV #)". The information "used" indicates that the corresponding one of the LDEVs 18 is being used by any one of the host computers 1; the information "reservable" indicates that the corresponding one of the LDEVs 18 is not being used by any of the host computers 1; and the information "used (LDEV #)" indicates that migration is being performed. The attribute information for the storage devices 16 may include, for example, three attributes which are respectively named "high speed internal device", "low speed internal device" and "low speed external device". The attribute "high speed internal device" indicates a high speed storage device capable of being directly used by the disk array apparatus 10; the attribute "low speed internal device" indicates a low speed storage device capable of being directly used by the disk array apparatus 10; and the attribute "low speed external device" indicates a low speed storage device existing outside the disk array apparatus 10. The first storage devices 16H have the attribute "high speed internal device"; the second storage devices 16L have the attribute "low speed internal device"; and the external storage device 5 has the attribute "low speed external device", The status information and the device attribute information are not limited to the above-described kinds. The first storage devices 16H can also be regarded as storage devices which are currently used, and the second storage devices 16L and the external storage device 5 can be also be regarded as storage devices which are used for saving data or archiving.

FIG. 2B is a diagram showing an example of the structure of the migration management table T2. The migration management table T2 is one example of a "management table for temporarily managing the limitation content of an access operation" and is used in migration control processing, which will be described later. The migration management table T2 manages, for example, an LDEV number for identifying an LDEV 18 whose access attribute has been set or reset, the kind of inhibit attribute, and the date and time when the access attribute was set or reset. This migration management table T2 is created when the access attribute of an LDEV 18 has been set or reset from the host computer 1 (or the SVP 2 or the console 3) and is not permanently stored. In the case where migration control (control to be executed to move a logical device) is completed, the migration management table T2 is deleted from the control memory 13. However, this example is not limitative, and the disk array apparatus 10 may also be configured so that the whole or part of the migration management table T2 is perpetually stored.

FIG. 2C is a diagram showing an example of the structure of the access attribute management table T3. The access attribute management table T3 is used in access attribute control processing, which will be described later. The access attribute management table T3 manages, for example, the LDEV numbers of the respective LDEVs 18 and access attribute control bits which have been set on each of the LDEVs 18, associating each of the LDEV numbers with the access attribute control bits. In addition, the access attribute management table T3 may also include authentication information (such as a password) for enabling access attributes to be modified only by a person having predetermined authority. The access attribute management table T3 functions as means for holding access attribute modes which are set for the respective LDEVs 18, and it also functions as means for inhibiting the settings of the access attribute modes from being modified by a subject having no authority. The access attribute management table T3 includes a number of rows that is equal to the number of implemented LDEVs 18.

The access attribute management table T3 has a read inhibit bit, a write inhibit bit, an inquiry inhibit bit, a read capacity 0 report bit and an S-vol disable bit in each of the columns corresponding to the respective LDEV numbers, as information for holding an access attribute mode (access attribute mode information) which is set for each of the LDEVs 18. The read inhibit bit indicates that, if its value is "1", the reading of data from the corresponding LDEV is disabled, while if the value is "0", the reading of data is enabled. The write inhibit bit indicates that, if its value is "1", the writing of data to the corresponding LDEV is disabled, while if the value is "0", the writing of data is enabled. The inquiry inhibit bit indicates that, if its value is "1", the recognition of the corresponding LDEV is disabled, while if the value is "0", the recognition is enabled. The read capacity 0 report bit indicates that, if its value is "1", a capacity of zero is reported in response to a read capacity command for the corresponding LDEV, while if the value is "0", an actual capacity is reported. The S-vol disable bit indicates that, if its value is "1", the S-vol specification is disabled with respect to the corresponding LDEV, while if the value is "0", the S-vol specification is enabled. Further details of each access attribute will be described later.

FIGS. 3A and 3B are diagrams showing the kinds of access attributes to be set for each of the LDEVs 18. Six kinds of access attribute modes can be set for each of the LDEVs 18, as will be described below in (Mode 1) to (Mode 6).

(Mode 1) Read/Write Enable

As shown in FIG. 3A, the host computer 1 can perform both reading and writing of data from and to an LDEV for which this access attribute mode has been set, and can also recognize this LDEV.

(Mode 2) Read Only

As shown in FIG. 3A, the host computer 1 can perform reading of data from an LDEV for which this access attribute mode has been set, and it can also recognize this LDEV, but is disabled from writing data to the LDEV.

(Mode 3) Read/Write Disable

As shown in FIG. 3A, the host computer 1 is disabled from both reading and writing data from and to an LDEV for which this access attribute mode has been set, but it can recognize this LDEV.

(Mode 4) Read Capacity 0

As shown in FIG. 3A, the host computer 1 can recognize an LDEV for which this access attribute mode has been set. However, in response to a read capacity command (a command to check the storage capacity of this LDEV) from the host computer 1, an answer indicating that the storage capacity is "0" is returned to the host computer 1. Accordingly, the host computer 1 cannot read or write data from or to this LDEV.

(Mode 5) Inquiry Inhibit

As shown in FIG. 3A, the host computer 1 cannot recognize an LDEV for which this access attribute mode has been set.

Namely, in response to an inquiry from the host computer 1 about how the LDEV can be recognized, an answer indicating that this LDEV does not exist is returned to the host computer 1. Accordingly, the host computer 1 cannot read or write data from or to the LDEV, nor gain any accesses to the LDEV, such as an access for checking the read capacity thereof. However, in a copy pair forming operation to be performed by the disk array apparatus 10 as an internal function thereof, the LDEV can be specified as a secondary volume relative to another LDEV (S-vol specification).

(Mode 6) Secondary Volume Disable (S-vol disable)

As shown in FIG. 3A, an LDEV for which this access attribute mode has been set cannot be specified as a secondary volume for duplexing any other LDEV. However, the host computer 1 can read and write data from and to this LDEV, and it can also recognize the same.

FIG. 3A shows what access control is performed by the disk array apparatus 10 as to each of LDEVs 18 for which the six kinds of access attribute modes have been set, respectively. In FIG. 3A, each circle means that access control is performed to enable the corresponding operation, while each cross means that access control is performed to disable the corresponding operation. The symbols "0" and "READ CAPACITY" concerning READ CAPACITY represent that the content of a response to a read capacity command from the host computer 1 is a capacity of "0" or an actual capacity of the LDEV.

Among the above-described six kinds of access attribute modes, the modes "read/write enable", "read only", "read/write disable" and "S-vol disable" can also be applied to LDEVs to be used by either main-frame host computers or open-system host computers. On the other hand, in this embodiment, the modes "read capacity 0" and "inquiry inhibit" can be applied to only LDEVs to be used by open-system host computers, and cannot be applied to LDEVs to be used by main-frame host computers. This configuration is not necessarily limitative.

Among the above-described six kinds of access attribute modes, any one selected from among the modes "read/write enable", "read only", "read/write disable", "read capacity 0" and "inquiry inhibit" can be set for one LDEV. On the other hand, the mode "S-vol disable" can be set for the same LDEV independently of the other five kinds of access attribute modes (namely, together with these five kinds). For example, the mode "read/write enable" and the mode "S-vol disable" can be set for the same LDEV.

FIG. 3B is a diagram showing the correspondence between the six kinds of access attribute modes and the bit patterns of the access attribute control bits (the read inhibit bit, the write inhibit bit, the inquiry inhibit bit, the read capacity 0 report bit, and the S-vol disable bit). In the access attribute management table T3, when the access attribute control bits are set in the bit patterns shown in FIG. 3B, each of the above-described six kinds of access attribute modes is set (or the mode settings are released).

FIG. 4 is a block diagram showing the relationship between the storage devices 16 and the LDEVs 18.

The following description will refer to the first storage devices 16H by way of example, but this is not limitative. Each of the LDEVs 18(#1 to #4) can be used by a different one of the host computers 1-1 to 1-4. The same host computer can also use a plurality of LDEVs 18. FIG. 4 illustratively shows a case where the respective LDEVs 18(#1 to #4) are used by the different host computers 1-1 to 1-4.

Each of the LDEVs 18(#1 to #4) is created to extend across a plurality of (in the illustrated example, four) physical storage devices 16H, by using their partial storage areas. The write inhibit bit is set for the LDEV 18(#2). Accordingly, the data of the LDEV 18(#2) cannot be updated from the host computer 1-2. The read/write inhibit bit is set for the LDEV 18(#3). Accordingly, the host computer 1-3 cannot perform data updating nor data reading on the LDEV 18(#3), The access attribute modes for each of the LDEVs 18 are managed by the access attribute management table T3 included in the control memory 13.

The CHA 11 is provided, for example, with an access attribute control program P1. The access attribute control program P1 provides the CHA 11 with an access attribute control function which is executed by a processor provided in the CHA 11. The access attribute control program P1 controls accesses to the individual LDEVs 18 by referring to the access attribute management table T3.

The control memory 13 stores the RAID configuration management table T1, the migration management table T2 and the access attribute management table T3.

The DKA 12 is provided with, for example, a migration control program P2 and an address translation program P3. The programs P2 and P3 give the DKA 12 a migration control function and an address translation function, respectively, as they are executed by a processor provided in the DKA 12, The migration control program P2 controls the storage position of each of the LDEVs 18 in accordance with an access attribute mode. The address translation program P3 translates logical addresses into physical addresses.

Figure 5A:
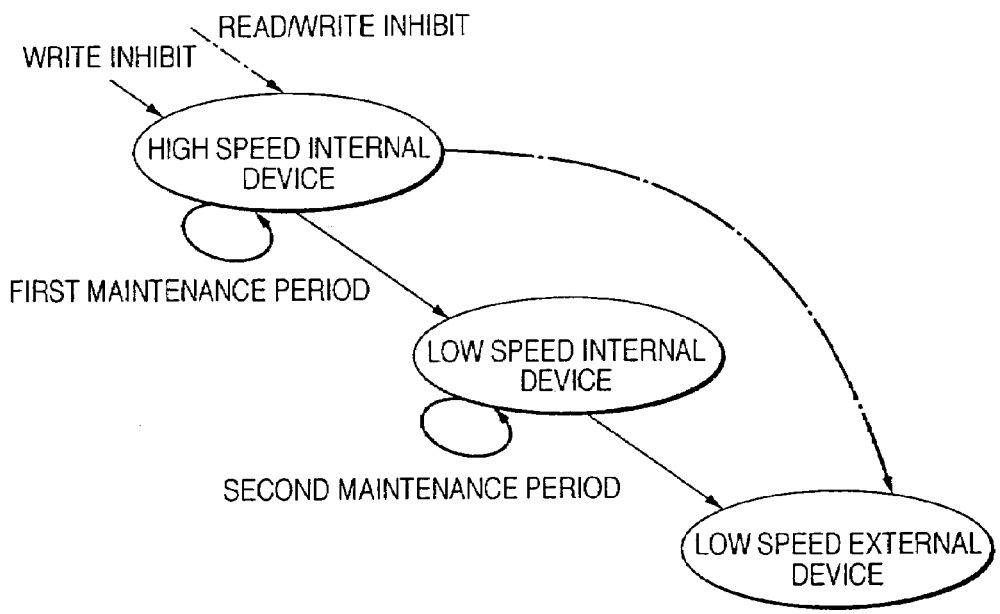
FIG. 5A is a diagram showing a case where a storage location moves according to the settings of access attribute modes, and also shows a case where access limitation has been set.
Figure 5B:
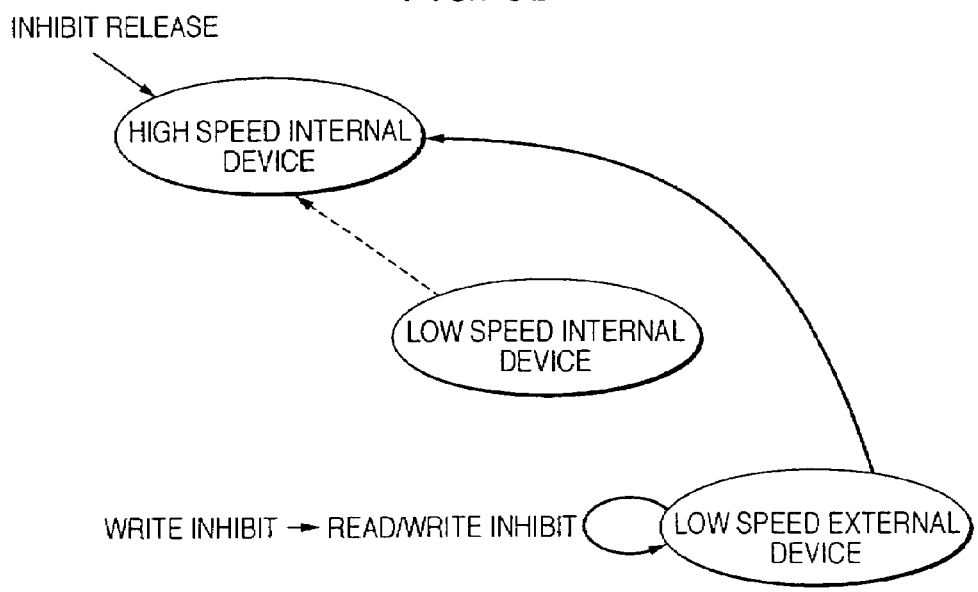
FIG. 5B is a diagram similar to FIG. 5A, showing a case where access limitation has been released.

FIGS. 5A and 5B are state transition diagrams schematically showing the state in which the storage position of one of the LDEVs 18 varies. FIG. 5A shows the case where an LDEV is moved (saved or archived) from a storage device of high access performance to a storage device of low access performance, while FIG. 5B shows the case where the LDEV is moved (restored) from the storage device of low access performance to the storage device of high access performance.

Although the details thereof will be described later, as shown in FIG. 5A, when the mode "read/write inhibit" is set for an LDEV which is set on the first storage devices 16H, which are "high speed external devices", this LDEV is transferred from the first storage devices 16H to the external storage device 5, which is a "low speed external device", as shown by a dot-dashed line in FIG. 5A. On the other hand, when the mode "write inhibit" is set for an LDEV which is set on the first storage devices 16H, this LDEV is transferred to the second storage devices 16L, which are "low speed internal devices", after the lapse of a predetermined maintenance period. Incidentally, after this LDEV has been stored in the second storage devices 16L for a second maintenance period, the LDEV may also be again moved from the second storage devices 16L to the external storage device 5. In the following description of migration control processing, reference will be made to the case where the LDEV is moved from the first storage devices 16H to the second storage devices 16L after the lapse of the first maintenance period, and a detailed description of the case where the LDEV is moved from the second storage devices 16L to the external storage device 5 after the lapse of the second maintenance period will be omitted.

As shown in FIG. 5B, when access limitation is released, that is, when the mode is changed to any access attribute other than "write inhibit" or "read/write inhibit", the LDEV is returned to the first storage devices 16H, which represent the original storage position. For example, when the mode "write inhibit" or "read/write inhibit" is released in the case where the LDEV is transferred to the second storage devices 16L, the LDEV is transferred from the second storage devices 16L to the first storage devices 16H as shown by a dashed line. On the other hand, when the mode "write inhibit" or "read/write inhibit" is released in the case where the LDEV is transferred to the external storage device 5, the LDEV is transferred from the external storage device 5 to the first storage devices 16H. Even when the access attribute mode is changed, if the mode is changed, for example, from "write inhibit" to "read/write inhibit", the storage position of the LDEV does not change. Incidentally, when access limitation is released, the LDEV can also be moved to a storage device different from the original storage device in which the LDEV has been set. For example, there is a case where a storage device of higher performance than the original storage device is added to the disk array apparatus 10.

Figure 6:
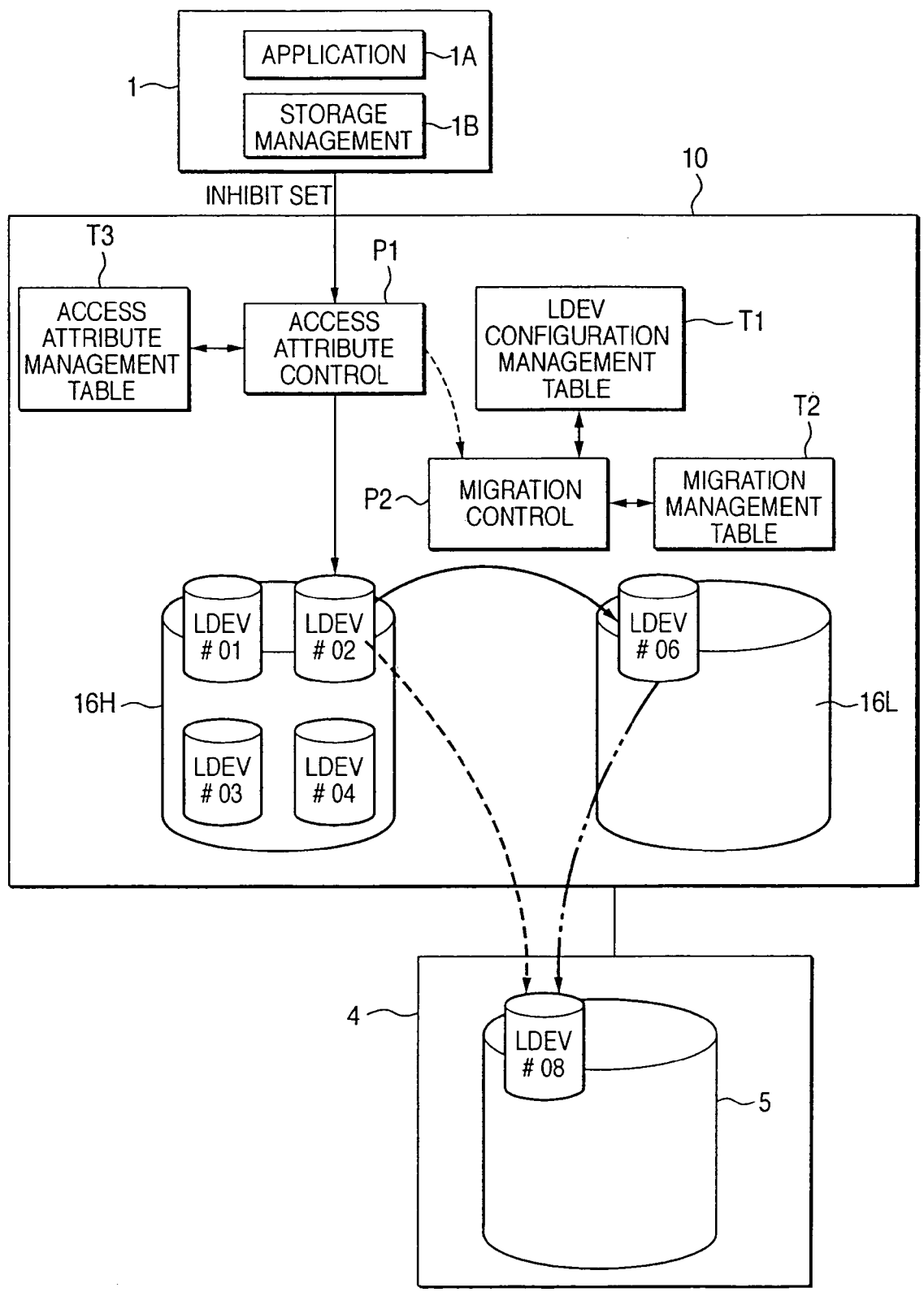
FIG. 6 is a schematic block diagram showing a cooperative relationship between migration control processing and access attribute control processing.

The entire operation of migration control according to this embodiment will be described below with reference to FIGS. 6 to 8. As shown in FIG. 6, when the storage management software 1B of the host computer 1 sets the mode "write inhibit" for the LDEV 18(#2) of the first storage devices 16H, this access attribute mode is stored in the access attribute management table T3. The access attribute control program P1 performs access control on the basis of the access attribute management table T3.

When a predetermined access attribute mode ("write inhibit" or "read/write inhibit") is set, information on this access attribute mode is registered in the migration management table T2. This registration is performed by the CHA 11. The migration control program P2 periodically refers to the migration management table T2, and if a predetermined access attribute mode is registered, the migration control program P2 moves the LDEV 18(#2), for which the predetermined access attribute mode has been set, to either the second storage devices 16L or the external storage device 5 by using the LDEV configuration management table T1.

Figure 7:
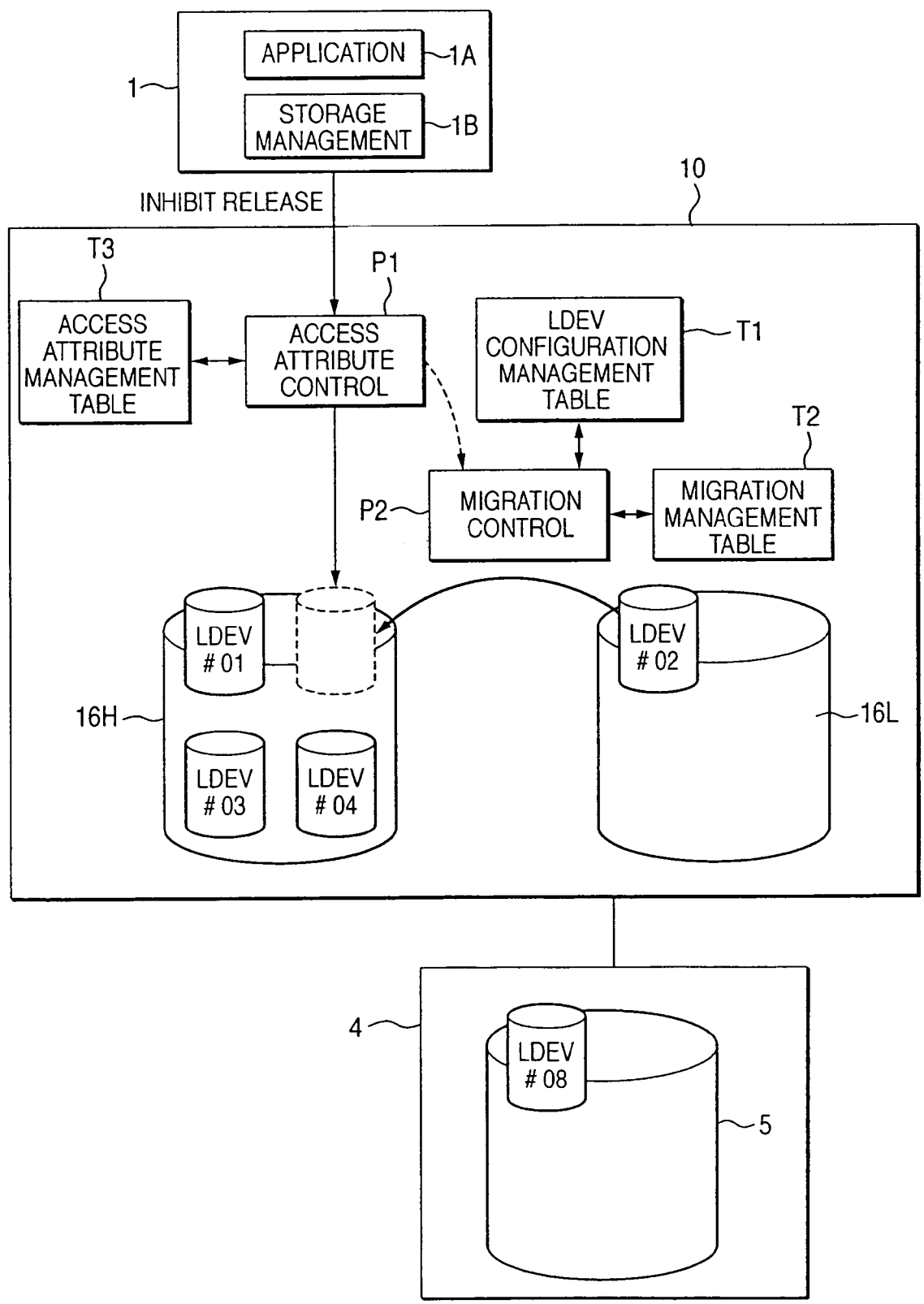
FIG. 7 is a schematic block diagram similar to FIG. 6.
Figure 8:
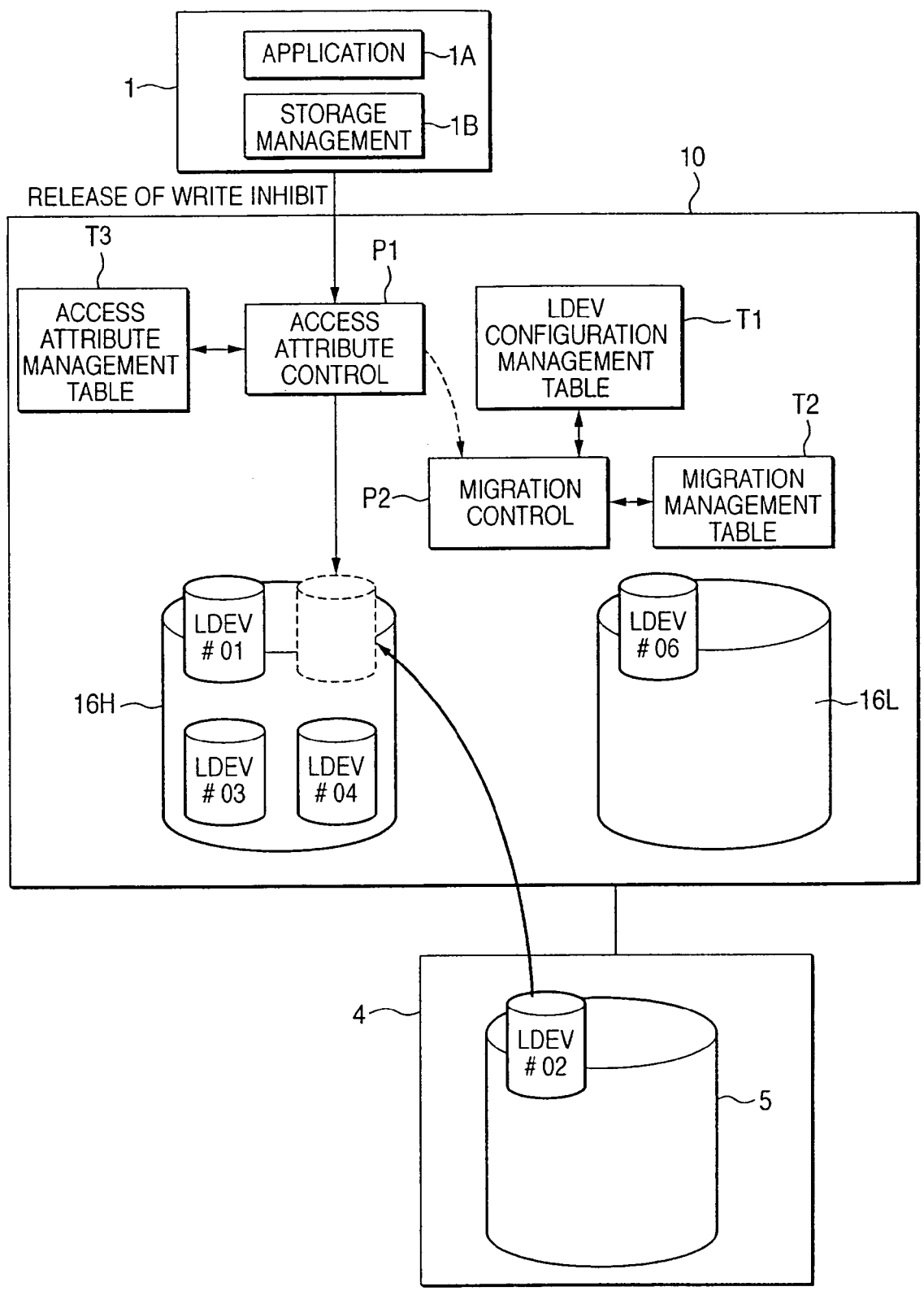
FIG. 8 is a schematic block diagram similar to FIG. 7.

As shown in FIG. 7, when the predetermined access attribute mode is released, the LDEV 18(#2) which has been transferred to the second storage devices 16L is transferred to the first storage devices 16H. In addition, as shown in FIG. 8, when the predetermined access attribute mode is released, the LDEV 18(#2) which has been transferred to the external storage device 5 is transferred to the first storage devices 16H.

Figure 9:
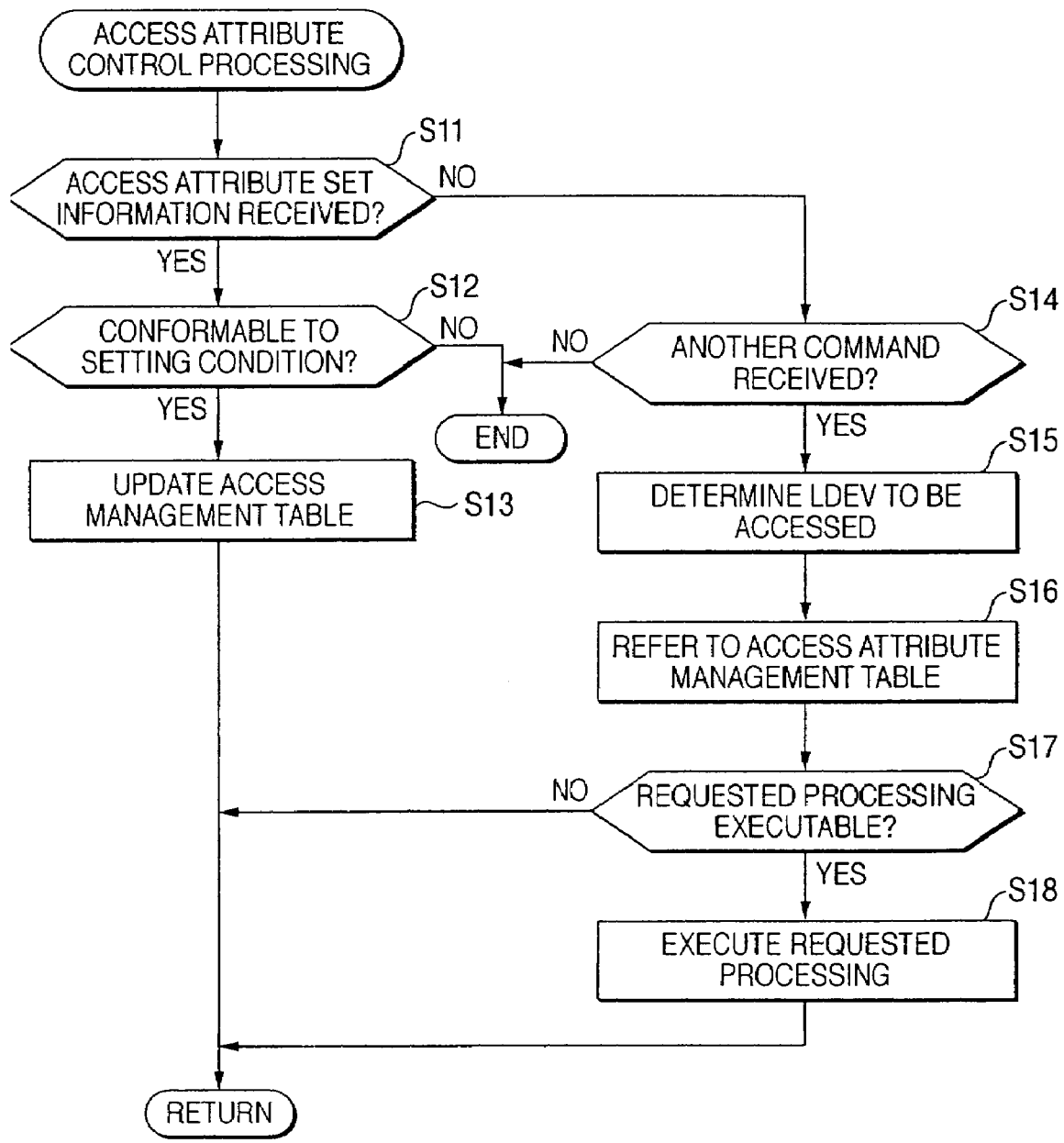
FIG. 9 is a flowchart of the access attribute control processing.

FIG. 9 is a flowchart showing an outline of the access attribute control processing. This processing is executed by the CHA 11.

First, the CHA 11 determines whether it has received a command to set an access attribute mode (S11). If the CHA 11 has received a command to set an access attribute mode (S11: YES), the CHA 11 determines whether the content of the command to set the specified access attribute is conformable to the setting conditions (S12). At this step, the CHA 11 checks whether the received command is an access attribute set command from the host computer 1 having authority. If the content of the command does not conform to the setting conditions (S12: NO), the CHA 11 brings the processing to an end without setting the access attribute mode. If the content of the command conforms to the setting conditions (S12: YES), the CHA 11 registers the set access attribute mode in the access attribute management table T3 (S13). Information about the settings of the access attribute mode is also registered in the migration management table T2 which is temporarily created in the control memory 13.

On the other hand, if the command received from the outside is not a command to set an access attribute mode (S11: NO), the CHA 11 determines whether it has received a command other than the access attribute set command (S14) If the CHA 11 has received data other than a command (S14: NO), the CHA 11 brings the processing to an end, If the CHA 11 has received a write command or a read command (S14: YES), the CHA 11 determines which of the LDEVs 18 has been requested as an LDEV to be accessed (S15) and refers to the access attribute management table T3 (S16). Then, the CHA 11 determines, on the basis of the access attribute management table T3, whether the CHA 11 can execute the content of processing requested from the host computer 1 (S17). For example, the CHA 11 determines whether writing to an LDEV 18 requested as a writing LDEV is enabled, and if the CHA 11 determines that the requested content can be processed (S17: YES), the CHA 11 executes the requested processing and returns an answer to the host computer 1 (S18). On the other hand, for example, if data updating of a write-disabled LDEV 18 is requested (S17: NO), the CHA 11 brings the processing to an end without executing the processing requested from the host computer 1. In this case, the CHA 11 notifies the host computer 1 that the requested processing cannot be executed.

Figure 10:
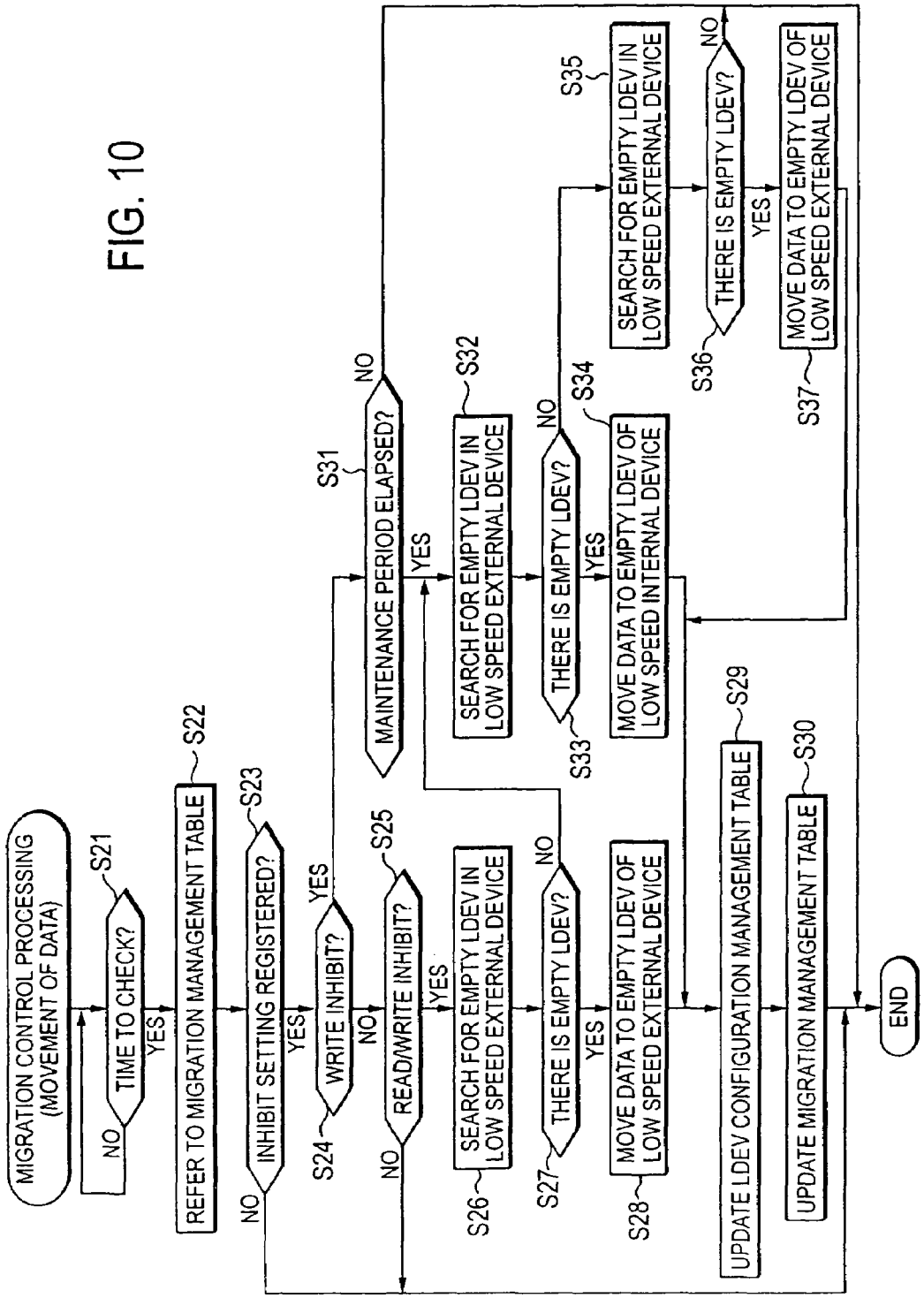
FIG. 10 is a flowchart of the migration control processing (for data movement)

FIG. 10 is a flowchart showing the outline of migration control processing. This processing is executed by the DKA 12. The DKA 12 periodically (or nonperiodically) refers to the migration management table T2 in the control memory 13 (S21 and S22). The DRA 12 checks to determined whether information about a new access limitation is registered in the migration management table T2 (S23). If information about an access limitation is not registered (S23: NO), the DKA 12 brings the processing to an end.

If a new access limitation is registered (S23: YES), the DKA 12 determines whether the mode "write inhibit" has been set (S24). If the mode "write inhibit" has not been set (S24: NO), the DKA 12 determines whether the mode "read/write inhibit" has been set (S25). If the mode "read/write inhibit" has been set (S25: YES), the DKA 12 searches for the low speed external device (the external storage device 5) by referring to the LDEV configuration management table T1 (S26), and it determines whether an empty LDEV exists in the external storage device 5 (S27). If an empty LDEV exists in the external storage device 5 (S27: YES), the DKA 12 moves an LDEV, for which the mode "read/write inhibit" has been set, from the first storage devices 16H to the empty LDEV of the external storage device 5 (S28). The DKA 12 stores a modified configuration resulting from this data movement into the LDEV configuration management table T1 (S29). The DKA 12 erases information about the access limitation of the moved data from the migration management table T2 (S30).

If the mode "write inhibit" has been set (S24: YES), the DKA 12 determines whether a predetermined maintenance period has elapsed from the date and time when the mode "write inhibit" has been set (S31). If the predetermined maintenance period has hot yet elapsed (S31: NO), the DKA 12 brings the processing to an end without performing data movement (S32). Accordingly, an LDEV for which the mode "write inhibit" has been set stays at the current storage location (the first storage devices 16H).

If the predetermined maintenance period has elapsed (S31: YES), the DKA 12 checks to determine whether an empty LDEV exists in the low speed internal device (the second storage devices 16L) by referring to the LDEV configuration management table T1 (S32 and S33). If an empty LDEV exists (S33: YES), the DKA 12 moves the LDEV, for which the mode "write inhibit" has been set, from the first storage devices 16H to the second storage devices 16L (S34). Then, after data movement has been completed, the DKA 12 updates the LDEV configuration management table T1 and the migration management table T2 in a manner similar to the above-described manner (S29 and S33).

On the other hand, if an empty LDEV does not exist in the second storage devices 16L (S33: NO), the DKA 12 searches for the configuration of the external storage device 5 on the basis of the LDEV configuration management table T1 (S35), and it determines whether an empty LDEV exists in the external storage device 5 (S36). If an empty LDEV does not exist in the external storage device 5 (S36: NO), the DKA 12 cannot perform data movement, and it brings the processing to an end. If an empty LDEV exists in the external storage device (S36: YES), the DKA 12 moves the LDEV for which the mode "write inhibit" has been set from the first storage devices 16H to the external storage device 5 (S37), and it updates the LDEV configuration management table T1 and the migration management table T2 and brings the processing to an end (S29 and S30).

On the other hand, in the case where the mode "read/write inhibit" has been set, if an empty LDEV does not exist in the external storage device 5 (S27: NO), the DKA 12 determines whether an empty LDEV exists in the second storage devices 16L (S32 and S33); and, if an empty LDEV exists in the second storage devices 16L (S33: YES), the DKA 12 moves the LDEV, for which the mode "read/write inhibit" has been set, from the first storage devices 16H to the second storage devices 16L (S34).

In this manner, locations to which data are to be moved are initially set for the respective predetermined access attribute modes ("write inhibit" and "read/write inhibit") (in the case of "write inhibit", the second storage devices 16L; in the case of "read/write inhibit", the external storage device 5), and if there is no empty area in an initially set location, the DKA 12 searches for an empty area in a storage device other than the initially set location (in the case of "write inhibit", if there is no empty area in the second storage devices 16L, the DKA 12 searches the external storage device 5; in the case of "read/write inhibit", if there is no empty area in the external storage device 5, the DNA 12 searches the second storage devices 16L).

Figure 11:
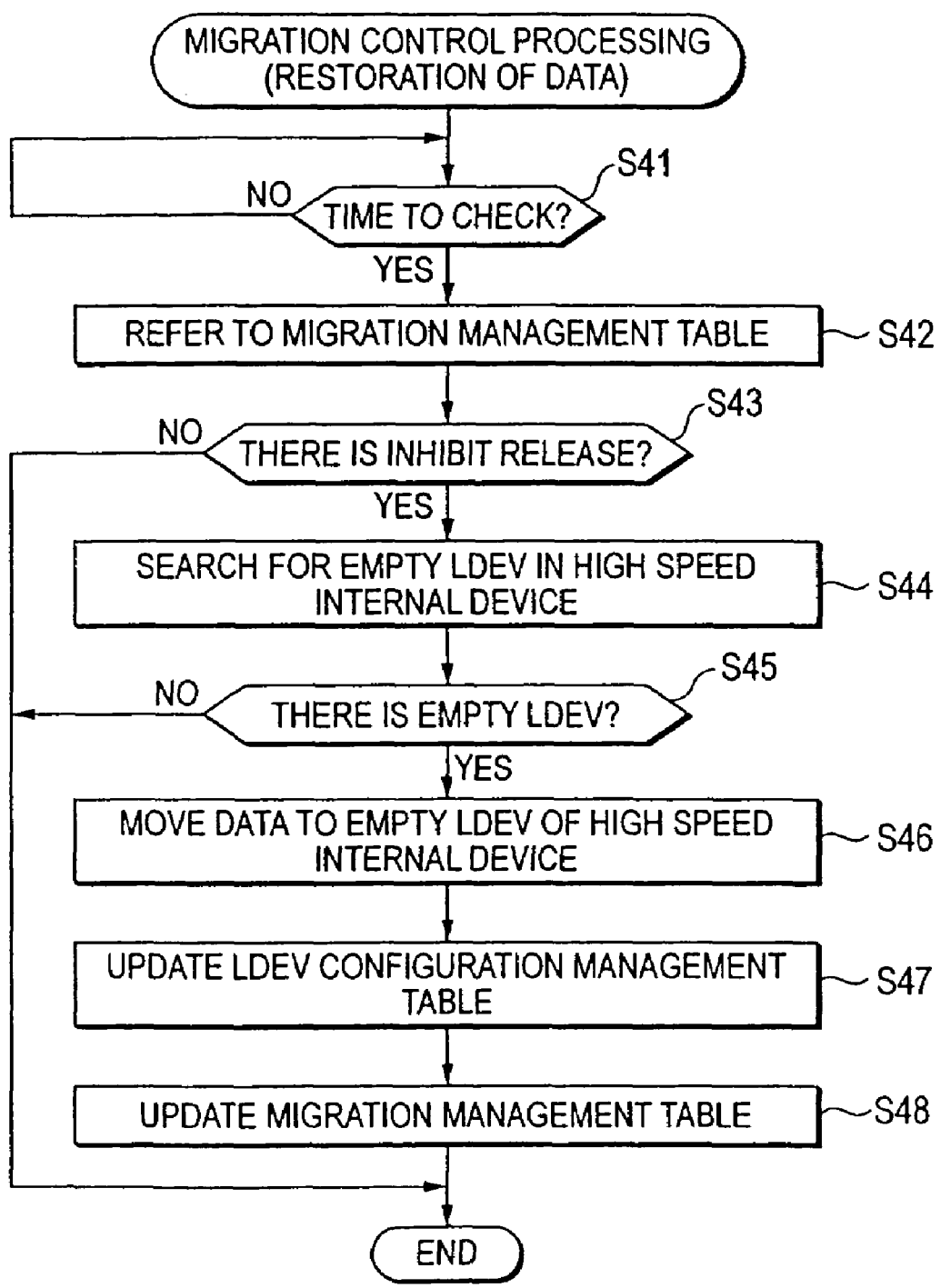
FIG. 11 is a flowchart of the migration control processing (for data restoration)

FIG. 11 shows an outline of the migration control processing to be executed in the case where an LDEV transferred from the first storage devices 16H to the second storage devices 16L or the external storage device 5 is restored to the first storage devices 16H. This processing is executed by the DNA12.

First, the DNA 12 checks the migration management table T2 (S41 and S42), and it determines whether there exists an LDEV for which an access attribute mode has been modified, that is, an LDEV for which a predetermined access limitation ("write inhibit" or "read/write inhibit") has been released (S43).

For example, as shown in FIG. 12A, since the LDEV 18(#2) has been moved to the LDEV 18(#8) of the external storage device 5, the use status of the LDEV 18 (#8) is set to "used (#02)". As shown in FIG. 12B, if the access limitation is released, information (represented by "-" in FIG. 12B) indicating the date and time of release and the fact that the access limitation has been released is recorded on the migration management table T2. In addition, when the access limitation is released, the contents of the access attribute management table T3 are modified, as shown in FIG. 12C. For example, the access attribute modes of the LDEV 18(#2) are modified to enable both reading and writing of the LDEV 18(#2).

In Step S43, if an LDEV for which the predetermined access limitation has been released does not exist (S43: NO), the DNA 12 brings the processing to an end. If an LDEV for which the predetermined access limitation has been. released exists (S43: YES), the DNA 12 searches for an empty LDEV in the first storage devices 16H, which are "high speed internal devices", by referring to the LDEV configuration management table T1, and it determines whether an empty LDEV exists (S44 and S45).

If an empty LDEV exists in the first storage devices 16H (S45: YES), the DNA 12 moves the LDEV, which has been transferred to the second storage devices 16L or the external storage device 5, to the first storage devices 16H (S46). Then, the DNA 12 reflects a modified configuration, resulting from this data movement, onto the LDEV configuration management table T1 (S47). In addition, to reflect this data movement, the DKA 12 erases information about the release of the access limitation, which has been recorded in the migration management table T2 (S48).

In the case where data movement is performed in the disk array apparatus 10 (internal migration), data to be moved is read to the cache memory 14 by the DKA 12 and is copied from the cache memory 14 to a storage device to which the data is to be moved. If data is to be moved between the inside and the outside of the disk array apparatus 10 (external migration), data to be moved is read to the cache memory 14 by the DKA 12 and is transmitted via the CHA 11 to a storage device to which the data is to be moved (in the case of inside→outside). Otherwise, data to be moved is read and stored into the cache memory 14 by the CHA 11, and this stored data is copied by the DNA 12 to an internal storage device to which the data is to be moved (in the case of outside →inside).

According to this embodiment, which is constructed in the above-described manner, in the case where either of the modes "write inhibit" and "read/write inhibit" is set, an LDEV (data) for which this access limitation has been set is moved from the current storage position to another storage position, whereby a simple data saving function, which does not need a special data saving operation, can be realized, thereby to improve the ease of use of the disk array apparatus.

When either of the modes "write inhibit" and "read/write inhibit" is set, it is possible to rationally infer that manipulation of data needs to be prevented, and, for example, mediumor long-term data saving is requested. In the case of medium- or long-term data saving, it is a general practice that data manipulation is, at the same time, required to be disabled, and writing of data needs to be disabled for the purpose of preventing manipulation. For this reason, an LDEV for which a predetermined access limitation has been set is moved from the first storage devices 16H, which are currently used, to the second storage devices 16L or the external storage device 5. Accordingly, merely by setting the access attribute modes, it is possible to move data without the need to perform any other manual operation. In addition, it is possible to ensure an empty area in the first storage devices 16H, which are currently frequently used, and it is possible to efficiently use the storage devices 16L and 5, which are low in frequency of use.

In the case where the mode "read/write inhibit" is set, it is determined, at the time of setting, that execution of long-term saving has also been selected, so that data is immediately moved to the external storage device 5. In the case where the mode "write inhibit" is set, since a read request is still enabled, the current storage position is maintained until the lapse of a maintenance period (which can be variably set within a range of, for example, several days to ten and several days or the like), and data is moved to another storage position after the lapse of the maintenance period. Accordingly, it is possible to improve the ease of use to a further extent and effectively use the storage resources.

Furthermore, it is possible to realize a simple data saving function by the cooperation between the access attribute control processing and the migration control processing, namely, by interlocking the access attribute control processing with the migration control processing. Accordingly, it is possible to provide a simple data saving function and management function without increasing the manufacturing cost. In addition, it is possible to save and manage a wide variety and a large quantity of data for a long term without the need for troubling a system manager.

In addition, since a data saving function and a data management function are provided within the disk array apparatus 10, it is possible to cope with cases where the configuration or the like of the host computer 1 is modified, whereby it is possible to reduce the time-consuming operations required to maintain the data saving function.

The invention is not limited to only the above-described embodiment. Various additions and modifications can be made by those skilled in the art without departing from the spirit and scope of the invention. For example, the migration control may also be executed not only by DKAs but also by the cooperative work between DKAs and CHAs or by other processors other than DKAs and CHAs, or by CHAs.

What is claimed is:

1. A disk array apparatus, comprising:
   first storage devices, which are high speed devices, having a plurality of first storage areas;
   second storage devices, which are low speed devices relative to the high speed devices, having a plurality of second storage areas; and
   a controller which is arranged to be coupled to a host computer and which controls a read/write operation of data to or from one of the first storage areas in response to a read/write command issued from the host computer;
   wherein the controller includes information relating to an access authority to each of the first storage areas, said information being used when a read/write command is received for reading/writing data stored in said first storage areas, and said information being changed in response to a command received by said disk array apparatus to change an access authority;
   wherein the controller executes control to move data from one of the first storage areas to one of the second storage areas in response to an access authority change command received from the host computer inhibiting an access authority of the host computer to the first storage area from which the data is moved;
   wherein the controller executes control to move data from one of the second storage areas to one of the first storage areas in response to an access authority change command received from the host computer releasing said inhibiting of an access authority of the host computer to said one of the first storage areas to which the data is moved.

2. A disk array apparatus according to claim 1, wherein the information relating to an access authority to each of the first storage areas includes information relating to a) a method of enabling both reading and writing, b) a method of enabling reading but inhibiting writing, or c) a method of inhibiting both reading and writing.

3. A disk array apparatus according to claim 2, wherein the controller includes an access attribute management table, and wherein the access attribute management table stores therein, the information relating to an access authority of each of the first storage areas.

4. A disk array apparatus according to claim 1, wherein each of the second storage areas is connected to the controller, and the controller operates so as to use the second storage areas in a similar manner to the first storage areas.

5. A disk array apparatus according to claim 1, wherein the controller includes information making each of the second storage areas correspond to a LUN (Logical Unit Number) managed by the disk array apparatus.

6. A disk array system comprising:
   said disk array apparatus according to claim 1; and
   a second disk array apparatus;
   wherein said second disk array apparatus comprises:
   third storage devices, which are low speed devices relative to the high speed devices, having a plurality of third storage areas; and
   a second controller which is coupled to said disk array apparatus and controls a read/write operation of data sent from said disk array apparatus, for one of said third storage areas.

7. A disk array apparatus according to claim 1, further comprising:
   a channel adapter arranged to control data transfer between the host computer and the disk array apparatus;
   wherein the channel adapter:
   determines whether it has received a command from the host computer to set an access authority to said one of the first storage areas;
   if the channel adapter has received a command from the host computer to set an access authority, the channel adapter determines whether the content of the command conforms to predetermined setting conditions as to whether the host computer sending the command has authority to set the access authority;
   if the content of the command does not conform to the setting conditions, the channel adapter ends processing without setting the access authority;
   if the content of the command conforms to the setting conditions, the channel adapter sets the access authority in an access attribute management table, and registers information about the settings of the access authority in a migration management table;
   if the command received from the host computer is not a command to set an access authority, the channel adapter determines whether it has received a command other than the access authority set command;

if the channel adapter has received data from the host computer other than a command, the channel adapter ends processing;

if the channel adapter has received a write command or a read command, the channel adapter determines which of the first storage devices has been requested to be accessed and refers to the access attribute management table; the channel adapter determines, on the basis of the access attribute management table, whether the channel adapter can execute the content of processing requested by the command according to the access authority of the host computer to the first storage area of the requested first storage device; and if the channel adapter determines that the requested processing can be executed, the channel adapter executes the requested processing and returns an answer to the host computer as to whether the requested processing can be executed.

8. A disk array apparatus according to claim 1, wherein the controller is a disk adapter that controls data transfer between the storage devices and a cache memory, and wherein the disk adapter:

refers to a migration management table to determined whether information about an access authority has been newly registered in the migration management table;

if information about an access authority has not been newly registered, the disk adapter ends processing;

if an access authority has been newly registered, the disk adapter determines whether an access authority "write inhibit" has been set with respect to said one of the first storage areas;

if the access authority "write inhibit" has not been set, the disk adapter determines whether an access authority "read/write inhibit" has been set with respect to said one of the first storage areas;

if the access authority "read/write inhibit" has been set, the disk adapter searches for a low-speed external storage device by referring to a storage device configuration management table, and determines whether an empty storage area exists in the external storage device;

if an empty storage area exists in the external storage device, the disk adapter executes control to move data from said one of the first storage areas for which the access authority "read/write inhibit" has been set, to the empty storage area of the external storage device, stores a modified configuration resulting from this data movement into the storage device configuration management table, and erases information about the access limitation of the moved data from the migration management table;

if the access authority "write inhibit" has been set, the disk adapter determines whether a predetermined maintenance period has elapsed from the date and time when the access authority "write inhibit";

if the predetermined maintenance period has not yet elapsed, the disk adapter ends the processing without performing data movement;

if the predetermined maintenance period has elapsed, the disk adapter determines whether an empty storage area exists in one of the second storage devices by referring to the storage device configuration management table;

if an empty storage area exists in one of the second storage devices, the disk adapter moves data from said one of the first storage areas for which the access authority "write inhibit" has been set to the empty storage area of the second storage device, and updates the storage configuration management table and the migration management table;

if an empty storage area does not exist in the second storage devices, the disk adapter searches for the configuration of the external storage device on the basis of the storage device configuration management table, and determines whether an empty storage area exists in the external storage device;

if an empty storage area does not exist in the external storage device, the disk adapter ends processing;

if an empty storage area exists in the external storage device, the disk adapter moves data from said one of the first storage areas for which the access authority "write inhibit" has been set to the empty storage area of the external storage device, updates the storage device configuration management table and the migration management table, and ends processing; and if the access authority "read/write inhibit" has been set, if an empty storage area does not exist in the external storage device, the disk adapter determines whether an empty storage device exists in the second storage devices and, if an empty storage area exists in the second storage devices, the disk adapter moves data from said one of the first storage areas for which the access authority "read/write inhibit" has been set to the empty storage area of the second storage devices.

9. A disk array apparatus according to claim 1, wherein the controller is a disk adapter that controls data transfer between the storage devices and a cache memory, and wherein the disk adapter:

checks a migration management table to determine whether there exists a first storage area for which an access authority has been changed;

if there exists a first storage area for which an access authority has been changed to release said inhibiting, the disk adapter modifies the contents of an access attribute management table;

if there exists no first storage area for which the access authority has been changed to release said inhibiting, the disk adapter ends processing;

if there exists a first storage area for which the access authority has been changed to release said inhibiting, the disk adapter searches for an empty storage area in the first storage devices by referring to a storage configuration management table, and determines whether an empty storage area in the first storage devices exists;

if an empty storage area exists in the first storage devices, the disk adapter moves data stored in the second storage devices or the external storage device to the first storage area for which the access authority has been changed to release said inhibiting; reflects a modified configuration, resulting from this data movement, onto the storage configuration management table; and erases information about the release of the inhibiting from the migration management table;

if the data movement is performed from the second storage areas to the first storage area, the disk adapter reads the data to the cache memory and then copies the data from the cache memory to the first storage area to which the data is to be moved;

if the data movement is performed from the external storage area to the first storage area, the disk adapter reads the data to the cache memory and transmits the data via a channel adapter to the first storage area to which the data is to be moved.

10. A disk array apparatus, comprising:

first storage devices, which are high speed devices, having a plurality of first storage areas;

second storage devices, which are low speed devices, relative to the high speed devices, having a plurality of second storage areas; and a controller which is arranged to be coupled to a host computer and which controls a read/write operation of data for one of the first storage areas in response to a read/write command issued from the host computer;

wherein the controller includes information relating to an access authority to each of the first storage areas, said information being used when a read/write command is received for reading/writing data stored in said first storage areas, and said information being changed in response to a command received by said disk array apparatus to change an access authority;

wherein the controller executes control to move data from one of the first storage areas to one of the second storage areas in response to an access authority change command received from the host computer inhibiting an access authority of the host computer to the first storage area from which the data is moved;

wherein the controller executes control to move data from one of the second storage areas to one of the first storage areas in response to an access authority change command received from the host computer releasing said inhibiting of an access authority of the host computer to said one of the first storage areas to which the data is moved;

the controller includes information relating to an access authority to said second storage areas; and said information is changed in response to a command received by said disk array apparatus to change an access authority.

11. A disk array apparatus according to claim 10, wherein the information relating to an access authority of each of the first storage areas includes information relating to at least one of a method of enabling both reading and writing, a method of enabling reading but inhibiting writing, and a method of inhibiting both reading and writing.

12. A disk array apparatus according to claim 10, wherein the controller includes an access attribute management table, and wherein the access attribute management table stores therein, as the information relating to an access authority of each of the first storage areas, information relating to at least one of a method of enabling both reading and writing, a method of enabling reading but inhibiting writing and a method of inhibiting both reading and writing, for each of the second storage areas.

13. A disk array apparatus according to claim 10, wherein each of the second storage areas is connected to the controller, and the controller operates so as to use the second storage areas in a similar manner to the first storage areas.

14. A disk array apparatus according to claim 10, wherein the controller includes information making each of the second storage areas correspond to a LUN (Logical Unit Number) managed by the disk array apparatus.

15. A disk array system comprising said disk array apparatus according to claim 10; and a second disk array apparatus, wherein said second disk array apparatus comprises:

third storage devices, which are low speed devices relative to the high speed devices, having a plurality of third storage areas; and a second controller which is coupled to said disk array apparatus and controls a read/write operation of data for said third storage areas.

* * * * *